(12) United States Patent
Idelevitch et al.

(10) Patent No.: US 10,744,922 B2
(45) Date of Patent: Aug. 18, 2020

(54) METHOD FOR OPERATING A TRANSPORT SYSTEM AND CORRESPONDING TRANSPORT SYSTEM

(71) Applicant: AUDI AG, Ingolstadt (DE)

(72) Inventors: Vladimir Idelevitch, Nüremberg (DE); Christina Fendt, Ingolstadt (DE); Sebastian Schindler, Ingolstadt (DE); Maximilian Ertl, Ingolstadt (DE); Stephan Beutler, Ingolstadt (DE); Daniel Budnik, Ingolstadt (DE); Frank Hehne, Ingolstadt (DE); Simon Reuschenbach, Ingolstadt (DE); Arne Bramfeld, Stuttgart (DE)

(73) Assignee: AUDI AG, Ingolstadt (DE)

( * ) Notice: Subject to any disclaimer, the term of this patent is extended or adjusted under 35 U.S.C. 154(b) by 147 days.

(21) Appl. No.: 15/943,966

(22) Filed: Apr. 3, 2018

(65) Prior Publication Data

US 2018/0297505 A1  Oct. 18, 2018

(30) Foreign Application Priority Data

Apr. 12, 2017 (DE) .......... 10 2017 206 292

(51) Int. Cl.
*B60P 3/07* (2006.01)
*B60S 13/00* (2006.01)
(Continued)

(52) U.S. Cl.
CPC .......... *B60P 3/07* (2013.01); *B60S 13/00* (2013.01); *E04H 6/34* (2013.01); *E04H 6/36* (2013.01);
(Continued)

(58) Field of Classification Search
CPC ... B60P 3/07; B60S 13/00; E04H 6/34; E04H 6/36; G05B 19/41895; G05B 1/00;
(Continued)

(56) References Cited

U.S. PATENT DOCUMENTS 4,992,775 A * 2/1991 Castle .............. G08B 25/10
  177/132
5,739,477 A * 4/1998 Queen .............. G01G 19/02
  177/126
(Continued)

FOREIGN PATENT DOCUMENTS

CN  102333669 A  1/2012
CN  204355017 U  5/2015
(Continued)

OTHER PUBLICATIONS

German Office Action dated Mar. 6, 2018 of corresponding application No. DE102017206292.4; 10 pgs.
(Continued)

*Primary Examiner* — Saul Rodriguez
*Assistant Examiner* — Ashley K Romano
(74) *Attorney, Agent, or Firm* — Maier & Maier, PLLC (57) ABSTRACT

The exemplary embodiments of the invention relate to methods for operating a transport system, which have a large number of transport mechanism and means. The invention further relates to a corresponding transport system.

10 Claims, 2 Drawing Sheets

(51) Int. Cl.
  *G05B 19/418* (2006.01)
  *G05B 1/00* (2006.01)
  *E04H 6/34* (2006.01)
  *E04H 6/36* (2006.01)
(52) U.S. Cl.
  CPC .... *G05B 19/41895* (2013.01); *B60L 2200/30* (2013.01); *B60L 2200/44* (2013.01); *G05B 1/00* (2013.01); *G05B 2219/50393* (2013.01); *Y02P 90/60* (2015.11)
(58) Field of Classification Search
  CPC ........... G05B 2219/50393; Y02P 90/60; B60L 2200/30; B60L 2200/44
  See application file for complete search history.

(56) References Cited

U.S. PATENT DOCUMENTS

| | | | |
|---|---|---|---|
| 7,838,782 B2 | 11/2010 | Hamilton et al. | |
| 9,607,285 B1* | 3/2017 | Wellman | G06Q 10/087 |
| 9,925,991 B2* | 3/2018 | Hou | B61K 5/04 |
| 9,931,972 B2* | 4/2018 | Larsen | B60P 3/125 |
| 10,023,095 B2* | 7/2018 | Temple | B60P 3/125 |
| 10,139,816 B2* | 11/2018 | Tabares | G05D 1/0011 |
| 10,160,468 B1* | 12/2018 | Hurd | B62B 5/0093 |
| 2010/0054904 A1 | 3/2010 | Stidd | |
| 2010/0154606 A1 | 6/2010 | Thyni | |
| 2010/0219610 A1 | 9/2010 | Shapery et al. | |
| 2011/0170994 A1 | 7/2011 | Coombs et al. | |
| 2012/0215393 A1 | 8/2012 | Schiedegger | |
| 2014/0100690 A1* | 4/2014 | Wurman | C07C 255/43 700/230 |
| 2016/0048130 A1* | 2/2016 | Vavrick | B60L 53/80 180/168 |
| 2017/0327091 A1* | 11/2017 | Capizzo | B60L 53/60 |
| 2018/0039282 A1* | 2/2018 | Gupta | G05D 1/0291 |
| 2018/0108102 A1* | 4/2018 | Kapuria | B65G 1/0492 |
| 2018/0173238 A1* | 6/2018 | Tsubota | G05D 1/0214 |
| 2018/0276604 A1* | 9/2018 | Gariepy | G05B 19/4184 |
| 2019/0064845 A1* | 2/2019 | Pardasani | G05D 1/0088 |

FOREIGN PATENT DOCUMENTS

| | | | |
|---|---|---|---|
| DE | 20306290 U1 | 8/2004 | |
| DE | 102005057652 A1 | 8/2007 | |
| DE | 102011109597 A1 | 2/2013 | |
| DE | 102014210088 A1 | 12/2014 | |
| DE | 102015203506 A1 | 9/2016 | |
| EP | 2086837 B1 | 12/2012 | |
| GB | 2 377 422 A | 1/2003 | |
| JP | S6047747 B2 | 10/1985 | |
| JP | 2016216936 A | 12/2016 | |
| WO | 1985001265 A1 | 3/1985 | |
| WO | 2004/045932 A1 | 6/2004 | |
| WO | WO2004045932 | * 6/2004 | ............. B60S 13/00 |
| WO | 2013054012 A1 | 4/2013 | |

OTHER PUBLICATIONS

European Search Report dated Sep. 4, 2018, in connection with corresponding EP Application No. 18160072.7 (8 pgs.).

Office Action dated Apr. 29, 2020, in corresponding Chinese Application No. 201810320851.2; 15 pages.

* cited by examiner

Fig. 1

METHOD FOR OPERATING A TRANSPORT SYSTEM AND CORRESPONDING TRANSPORT SYSTEM

FIELD

The invention relates to a method for operating a transport system, which has a large number of transport means. The invention further relates to a corresponding transport system.

BACKGROUND

For some time, it has been observed that boundary conditions or constraints to mobility are changing dramatically and quickly. This applies, in particular, to urban mobility, that is, to mobility relating to cities. This change results, for example, from lack of space, which leads particularly to traffic jams, as well as from emissions of conventional vehicles or motor vehicles that are usually operated with combustibles or fuels. Even today, conventional motor vehicles are no longer permitted to drive, or at least only permitted to drive with restrictions, in some urban areas. In order to adjust to this change in mobility, new concepts are required, which, in particular, make possible an individual and seamless mobility.

SUMMARY

Therefore, the object of the invention is to propose a method for operating a transport system, which, in comparison to known methods, has advantages and, in particular, makes possible such an individual and seamless mobility.

The transport system has a large number of particularly emission-free transport means that can move independently of one another and are assembled into a total set of transport means. When a transport means request at a central control unit occurs, the central control unit selects a plurality of transport means from the total set of transport means, assigns them to a subset of transport means, and autonomously conveys them to a transport starting location, wherein, at the transport starting location, a vehicle having a plurality of wheel axles is jointly picked up by the transport means included in the subset of transport means, in that, on sides of the wheel axles that face away from each other, respectively, at least one of the transport means is arranged next to at least one wheel of the respective wheel axle, and subsequently the transport means are moved toward one another or away from one another autonomously, for raising the vehicle.

In this regard, the transport system serves for the transport of vehicles. The vehicle can fundamentally be designed in any way; in particular, the number of wheel axles is fundamentally arbitrary, as is also the number of wheels per wheel axle. Preferably, however, the vehicle has a number of wheels that makes possible a stable arrangement of the vehicle on an undersurface and consequently also on the transport means by means of the wheels alone. Preferably, therefore, at least three wheels or four wheels are provided, which are spaced apart from one another on the vehicle.

The transport system or the transport means is adapted to or at least can be adapted to the vehicle. This means, for example, that the transport means has a contact surface that is suitable for the wheels and/or means for fixation of the wheels on the transport means. For example, the transport system serves for the transport of the vehicle without persons being present in the vehicle, in particular, that is, without a driver of the vehicle.

Preferably, however, the transport system is used for the transport of the vehicle, while at least one person, for example, the driver, is present in the vehicle. This is meaningful, in particular, in connection with urban mobility in a city area. For example, the vehicle travels under its own power, that is, in particular by use of an internal combustion engine, up to an area boundary, in particular, a city limit, and is picked up at the area boundary by the transport system or the transport means and transported into the area limited by the area boundary, preferably with the internal combustion engine switched off. Accordingly, it is possible to move the vehicle when the drive assembly is switched off, and, in particular, to move it to the desired transport destination location, which can lie in the limited area.

The transport system comprises the large number of transport means. The transport means can be fundamentally different from one another or can be constructed identically at least in part or in whole. Each of the transport means can be moved independently of every other of the transport means. This means preferably that each of the transport means can be operated completely autonomously; that is, for example, it travels or can travel autonomously and automatically, for example, toward the transport starting location that is assigned to it. For this purpose, the transport means are correspondingly designed; that is, they have, for example, means for implementing an autonomous or independent driving operation. These means can comprise, in particular, a navigation device, a route determination device, an environment recognition device, or the equivalent.

The transport means are preferably emission-free; that is, they produce no or nearly no exhaust during their operation. This is ensured, for example, by way of a purely electric drive of the transport means. Preferably, each of the transport means is equipped with at least one electrical machine or electric motor for its drive as well as with a corresponding energy storage unit for the electrical energy needed for operating the electrical machine. Additional requirements that are placed on the transport means can ensue from safety regulations that, under certain circumstances, are to be observed at the site of operation, in particular, in the case that the transport means are to be capable of operation in public areas, preferably on public roads.

It is then provided that the transport means of the transport system are assembled into the total set of transport means. In this way, the total set of transport means is a logical assembly of all transport means of the transport system, regardless of where they are currently located. The transport means included in the total set of transport means can each be present, at least independently of one another, at different locations, at least in part at at least one location or at a plurality of locations or all can be at the same location, for example, at a common starting location. In any case, however, the transport means represent a part of the total set of transport means, even when they are distributed over a wide area.

If a transport means request arrives at the central control unit, a request that, for example, is triggered by an operator and/or by an assistance device, then the subset of transport means is assembled, namely, from transport means that are included in the total set of transport means. The set of transport means is assembled in that, first, the vehicle that is to be transported is evaluated or analyzed and a number of transport means that is sufficient for carrying out the transport of the vehicle is determined. This number is focused, for example, on the number of wheel axles and/or the number of wheels. From the total set of transport means, a number of transport means that corresponds to the transport means number determined is then chosen and assigned to the subset of transport means.

Preferably, during the selection or assignment, operating parameters or state parameters of the transport means are taken into consideration, in particular a current location of the transport means, an available range of travel, and the like. A suitability of the respective transport means for the transporting of the vehicle can also be evaluated. For this purpose, for example, at least one loading parameter, such as the type of vehicle or the kind of vehicle, the weight of the vehicle, and/or an existing transport device for the vehicle, that is, for example, a transport means attachment, or the equivalent, is or are taken into consideration More preferably, an availability of the transport means or of the respective transport means is taken into consideration This means that transport means already assigned to another transport means subset are not selected and assigned to the subset of transport means, because they are not available at the time. Conversely, this means that the transport means assigned to the subset of transport means are identified as not being available and are not assigned to any other subset of transport means as long as this is the case, that is, as long as they are assigned to this subset of transport means. Only when or after the subset of transport means is cancelled are the transport means that have been included thus far in the subset of transport means once again identified as being available and can correspondingly be assigned to the other subset of transport means.

Preferably, the central control unit, together with the transport means request, contains the information about the vehicle that is to be transported and/or characteristic parameters of the vehicle, that is, for example, the kind or the type, the weight or the mass, a number of wheel axles, a number of wheels of the vehicle, or the like. From this data, the central control unit can determine the number of transport means that is sufficient for carrying out the transport and can select the suitable transport means.

Additionally to the number of transport means, the transport starting location is determined. The transport starting locations correspond here to all of the transport means assigned to the subset of transport means. The transport starting location is preferably also part of the transport means request or is transmitted together with it to the central control unit. In this case, the transport starting location is predetermined, for example, by the operator and/or the assistance device.

Following the assignment of the transport means to the subset of transport means, the transport means are autonomously conveyed to their respective transport starting location or to the transport starting location. The transport starting location pertinent to each transport means is thus transmitted to the transport means, after which the transport means autonomously heads toward its transport starting location. Preferably, the same transport starting location is assigned or transmitted to all transport means of the subset of transport means. It may happen that the transport means are initially present at completely different locations and are subsequently conveyed to the same transport starting location.

The conveyance is made autonomously, that is, without the influence of the operator and/or of the assistance device that has triggered the transport means request. Instead, preferably each of the transport means itself takes on its route planning, which leads it from its current location to the transport starting location. However, the route planning can also be taken on by the central control unit and, for example, can be transmitted to the respective transport means before the conveyance begins or when the conveyance begins. Each of the transport means is equipped for a completely autonomous transport operation or driving operation. In particular, in this regard, each of the transport means is equipped with a corresponding sensor device, in particular an environmental recognition device, which preferably has at least one environmental sensor or the equivalent.

If the transport means present in the subset of transport means have arrived at the transport starting location, then the vehicle that is to be transported is picked up and the transport of the vehicle to transport destination location is carried out. It is thereby provided that a plurality of transport means jointly transport the vehicle to the common transport destination location. However, it is always important that the transport means are assigned to the subset of transport means, that is, are assigned logically to one another, in particular in the central control unit or in a memory unit of the central control unit.

The joint picking up of the vehicle takes place as follows: the transport means included in the subset of transport means are arranged on sides of the wheel axles that face away from each other, in particular pairwise in each case. The latter is understood to mean that one of the transport means is arranged on a first side of a first of the wheel axles and another of the transport means is arranged on a second of the wheel axles that lies opposite to the first side. In this case, the transport means are each arranged adjacent to at least one wheel of the corresponding wheel axle, that is, in front of or behind the wheel in the direction of travel, so that, as viewed in the axial direction with respect to the axle of the wheel, the transport means is arranged overlapping with the wheel and, in particular, completely overlapping. For example, the transport means are arranged in such a way that they each rest against a wheel of the vehicle, that is, are in physical contact with it.

The arrangement of the transport means with respect to the wheel axles or the wheels of the vehicle takes place autonomously, wherein, for this purpose, preferably the transport means communicate with one another, either directly or indirectly via the central control unit. For example, the transport means detect the respective wheel of the vehicle by means of a suitable detection apparatus, which, for example, works optically, acoustically, or inductively.

Subsequently, for raising the vehicle, the transport means are autonomously shifted toward one another, when they are located outside of the area between the axles, or the transport means are autonomously shifted away from one another, when they are located in the area between the axles. This takes place preferably essentially in the longitudinal direction of the vehicle. The shifting here is conducted in such a way that the vehicle or its wheel axles is or are together forced upward jointly by the transport means, so that, subsequently, the vehicle or its wheels comes or come to lie on the transport means. For example, for picking up the vehicle, the transport means have an inclined surface or ramp, which is forced under the vehicle or the wheels thereof through the shifting of the transport means toward one another, and consequently raises the vehicle or the wheels thereof.

For example, the inclined surface or ramp is formed roughly centered at the transport means. At least on one side and preferably on both sides of the inclined surface or ramp, a housing element can (respectively) be arranged, wherein, for example, the drive device or the electric motor, the energy storage unit, or the like is arranged in the housing element. In the case of two housing elements that adjoin the inclined surface or the ramp, the transport means has, in section, an essentially U-shaped design, because the housing elements protrude over the inclined surface or ramp at least in some regions and, in particular, in all regions in the direction facing away from the undersurface. In this way, the housing elements represent, at the same time, a holding apparatus for the wheel of the vehicle that is arranged on the transport means, which consequently cannot go downward from the inclined surface or ramp in the lateral direction or in the axial direction with respect to wheel axle, but rather comes to rest against the housing elements.

Additionally or alternatively, suitable holding means that serve for holding the wheel relative to the transport means can be formed on the transport means. The holding means can be designed, for example, in the form of a depression or elevation in which the wheel comes to rest after the vehicle has been raised. Alternatively, a wall can be arranged in such a way that, during the raising, the wheel cannot be shifted outward over the inclined surface or ramp. Accordingly, after the vehicle has been raised, the wheel should rest against the wall. Alternatively or additionally, it can obviously be provided that the respective wheel is fixed in place on the corresponding transport means by means of a suitable actuator in a form-fitting and/or force-fitting manner.

After the vehicle has been raised, the transport means transport it jointly to the common transport destination location. After the transport destination location has been reached by the transport means, the vehicle is preferably deposited and, subsequently, the subset of transport means is cancelled. This means that, ultimately, the transport means included thus far in the subset of transport means are identified once again as being available, so that they can be assigned once again by the central control unit to a subset of transport means. The identification of the transport means as being available is made, in turn, preferably in the central control unit or in a memory unit thereof, so that the availability of the individual transport means can be accessed centrally and checked as needed.

An approach of this kind makes possible an extremely flexible operation of the transport system, in particular the individual and seamless mobility already mentioned above. This is due, in particular, to the modularity of the transport system, the transport means of which can be assembled in any way and employed for the transporting of the vehicle. The seamless mobility is ensured, in particular, by moving the vehicle in part by its own power and in part by means of the transport means, wherein, in the first case, the internal combustion engine of the vehicle is in operation and, in the latter case, it is preferably not in operation, in particular at least until the transport destination location has been reached.

In the scope of another embodiment of the invention, it is provided that the transport means actuate at least one vehicle component of the vehicle by means of a communication connection with the vehicle. The communication connection is preferably established after the transport means have reached the transport starting location, in particular prior to raising the vehicle. The communication connection can be established directly from the transport means to the vehicle or to the vehicle component. It is also possible, additionally or alternatively, to provide for only an indirect communication connection of the transport means to the vehicle or to the vehicle component via the central control unit. Via the communication connection, the transport means can actuate the vehicle component of the vehicle. The communication connection can be wireless or wired.

Additionally or alternatively to the communication connection, an electrical connection for energy transfer can be provided. By way of said electrical connection, for example, an energy storage unit and/or an energy source of the vehicle is/are electrically connected to at least one of the transport means, namely, preferably to a drive device, in particular, to the electric motor of the transport means. By way of the electrical connection, the at least one transport means, in particular, the drive device thereof, can be operated with electrical current, which is supplied by the vehicle. The supplied current is taken, for example, from the energy storage unit of the vehicle. Additionally or alternatively, it can be provided at least temporarily that the internal combustion engine of the vehicle is operated for generating electrical current, so that the internal combustion engine constitutes part of the aforementioned energy source. In this respect, the internal combustion engine serves as a range extender. Such an operating mode is implemented, however, preferably only in an emergency.

An enhancement of the invention provides that, as a vehicle component, a signal system of the vehicle or a drive device of the vehicle, in particular a drive assembly, and/or a manual gearshift transmission, and/or a braking system of the vehicle is/are used. In this way, it is possible to actuate the drive device and/or the braking system of the vehicle via the communication connection. For example, the drive device, which has the drive assembly and/or the manual gearshift transmission, is actuated for driving the vehicle onto the transport means in that, by means of the drive assembly, a torque is applied to the corresponding wheel or the corresponding wheel axle. However, it can also be provided that the drive device and/or the braking system is/are actuated in such a way that the wheel or the wheels that are to be raised by means of the transport means are released for a rotational movement, so that the transport means can be moved toward one another without anything further, in order to raise the vehicle.

Additionally or alternatively, the actuation of the signal system of the vehicle is provided via the communication connection. For example, during the raising and/or the transporting, a blinking warning light system of the vehicle is activated, which is part of the signal system. It can also be provided that a travel direction indicator system of the signal device is used for displaying changes in the direction of travel of the transport means and consequently also of the vehicle.

Another preferred embodiment of the invention provides that the transport means actuate the vehicle component in such a way that, during the loading, the wheel can rotate freely or rotates for driving onto the transport means, and/or that, after the loading and, in particular, during the transport, the wheel is locked. Reference to an approach of this kind was already made above. More preferably, the vehicle component—that is, in particular, the drive device and the braking system—will be actuated in such a way that the raising of the vehicle will be assisted, but subsequently, the wheels are secured from unintentionally rolling off the transport means. For example, after the loading, therefore, the wheel is locked at least in part and, in particular, completely by switching off the drive assembly and by engaging a gear at the manual gearshift transmission, in particular, a lowest gear of the manual gearshift transmission, and/or by braking the wheel by means of the braking system.

Another embodiment of the invention provides that, after the raising and, in particular, during the transport, the vehicle is fixed in place on the transport means. For this purpose, it is possible, for example—as already explained above—to lock the wheel after the loading or during the transport, in particular, through corresponding actuation of the vehicle component via the communication connection. It is also possible, however, to provide other possibilities for fixing the vehicle in place on the transport means. For example, the transport means are equipped with corresponding holding means, by means of which the vehicle, in particular, the wheel arranged on the respective transport means, can be fixed in place in a force-fitting and/or form-fitting manner.

Another preferred embodiment of the invention provides that, after it has been raised, the vehicle is transported to a transport destination location and is unloaded at it, and that, after the transport destination location has been reached by the transport means, the subset of transport means is cancelled. Initially, therefore, after raising the vehicle, it is transported to the transport destination location. At the transport destination location, the vehicle is unloaded. Preferably, the unloading takes place in reverse sequence to the loading.

It is also possible, during the unloading, for the transport means to actuate the at least one vehicle component of the vehicle, namely, by way of the communication connection. For example, the unloading is assisted by corresponding actuation of the drive device and/or of the braking system of the vehicle. After the unloading or deposition of the vehicle, the subset of transport means is again cancelled, so that the transport means included thus far in the subset of transport means is identified as being available once again, and correspondingly can be assigned once again by the central control unit to a subset of transport means.

A preferred enhancement of the invention provides that the transport means for the subset of transport means are selected on the basis of a quantity of energy that is needed for reaching the transport starting location and the transport destination location, and/or on the basis of a particular remaining residual quantity of energy of the transport means. In this way, the transport means are only assigned to the subset of transport means when the quantity of energy that is needed for reaching first the transport starting location and subsequently, the transport destination location is less than the remaining residual quantity of energy of the particular transport means.

The residual quantity of energy defines the remaining range of travel of the transport means or plurality of transport means, that is, the distance that can still be traversed by the latter. In the determination of the needed quantity of energy, it is possible to employ, for example, a topology of the distance to be traveled between the transport starting location and the transport destination location, that is, for example, upgrades and/or downgrades along this distance. The current traffic situation can also enter into the determination of the needed quantity of energy. The residual quantity of energy remaining after arrival of the transport means at the transport destination location can fundamentally be equal to or at least nearly zero. In this case, it is preferably provided for the transport means to be charged directly at the transport destination location or picked up from the transport destination location.

An enhancement of the invention provides that, in the selection of the transport means, additionally a distance of the transport destination location from a maintenance device and/or charging device for the transport means is taken into consideration. The transport system comprises the at least one maintenance device and/or charging device. At said device, maintenance work—for example, necessary repairs—can be carried out on the transport means, for example. Additionally or alternatively, it can be provided that the energy storage unit of the transport means is re-charged. In this respect, electrical energy for re-charging the energy storage unit is supplied at the maintenance device and/or charging device.

In the selection of the transport means, it is then additionally taken into consideration whether, after arrival at the transport destination location, that is, after the transport has been carried out, the transport means still have a residual quantity of energy available that is sufficiently large to drive successfully toward the maintenance device and/or charging device, that is, to reach the device(s). Only when this is the case is the transport means assigned to the subset of transport means. Otherwise, another transport means is selected from the total set of transport means and assigned to the subset of transport means.

Another embodiment of the invention provides that the transport means that jointly take up the load and or raise the load autonomously keep a constant distance between them at least during the transport or are coupled to one another, in particular, mechanically, magnetically, and/or pneumatically. In this way, it is provided that the transport means not only jointly take up or raise the load, but, in addition, also jointly carry out the transport of the load from the transport starting location to the transport destination location.

During the transport, the transport means autonomously shall keep the distance between them constant, wherein they are preferably spaced apart from one another, that is, are not directly connected to one another. A connection between the transport means is exclusively provided here by way of the vehicle and/or the undersurface on which the transport means move. In order to keep the distance constant, the transport means or at least one of these transport means is/are furnished with corresponding devices, such as, for example, with at least one distance sensor, or—advantageously—with a plurality of distance sensors, which preferably have, at least in part, different alignments. The distance sensor or each of the distance sensors can be designed, for example, as an optical or acoustic distance sensor. Preferably, the transport means has distance sensors of different kind, which, in addition, are aligned identically—that is, for example, an optical distance sensor and an acoustic distance sensor.

Additionally or alternatively, it can be provided that, during the transport, the transport means are coupled to one another. It is therefore provided here that, after the transport starting location has been reached and prior to picking up the vehicle or, alternatively, after picking up the vehicle, but prior to carrying out the transport, the transport means serving for transport of the vehicle are coupled to one another. This coupling is preferably triggered once again after the transport destination location has been reached and, in particular, after the vehicle has been deposited, for example together with the cancellation of the subset of transport means. The coupling of the transport means can, for example, be carried out mechanically, magnetically, and/or pneumatically, for which purpose the transport means have corresponding devices.

Regardless of whether or not the transport means are coupled to one another and whether the distance between them is maintained autonomously, it can be provided that the transport means present in the subset of transport means move in a specific, fixed formation. This can be determined before the vehicle is picked up and, in particular, depending on the vehicle or on the kind of vehicle.

Another preferred embodiment of the invention provides that, for a joint transport of the vehicle by means of a plurality of transport means, the transport means included in the subset of transport means are divided into at least one master transport means and at least one slave transport means. The master transport means in this way takes on at least some functions of the slave transport means, which the latter, for this purpose, hands over to the master transport means. For example, the master transport means takes over the sole communication with the central control unit and further conveys instructions from the central control unit to the slave transport means.

In other words, it is provided that the subset of transport means or the transport means included in it is or are controlled, at least in part and preferably completely, by the at least one master transport means. For this purpose, the master transport means issues corresponding instructions to the slave transport means, which implements these instructions. Conversely, no such instructions are transmitted. However, the slave transport means can transmit status messages on its operating state and/or an environment monitoring, for example, to the master transport means. The environment monitoring is preferably carried out here by means of the already mentioned environment recognition device.

More preferably, it is provided that the master transport means establishes a route to be traveled or receives a route to be traveled, which is transmitted from the central control unit. The master transport means further conveys the route to the slave transport means, so that said slave transport means can travel the route independently. Alternatively, it can obviously be provided that the master transport means takes over the actuation of a drive device and/or of a steering device of the at least one slave transport means and thus essentially remotely controls it.

The invention obviously also relates to a transport system, in particular, for implementing the method in accordance with the preceding statements, wherein the transport system has a large number of transport means, which are assembled into a total set of transport means, which can move independently of one another, and are, in particular, emission-free, and, when there is a request at a central control unit, the system is designed to select a plurality of transport means from the total set of transport means, to assign them to a subset of transport means, and to autonomously convey them to a transport starting location, wherein, at a transport starting location, a vehicle having a plurality of wheel axles is picked up jointly by the transport means included in the subset of transport means, as follows: on sides of the wheel axles that face away from each other, at least one of the transport means is arranged adjacent to at least one wheel of the respective wheel axle each time, and subsequently the transport means are moved toward one another autonomously for raising the vehicle.

Reference has already been made to the advantages of an approach of this kind or a design of the transport system of this kind. Both the transport system and the method for its operation can be further developed in accordance with the preceding statements, so that reference to said embodiments is made in this regard.

BRIEF DESCRIPTION OF THE DRAWINGS

The invention will be explained in detail below on the basis of the exemplary embodiments illustrated in the drawing, without resulting in any limitation of the invention thereby. Shown herein are.

DETAILED DESCRIPTION OF THE DRAWINGS

Figure 1:
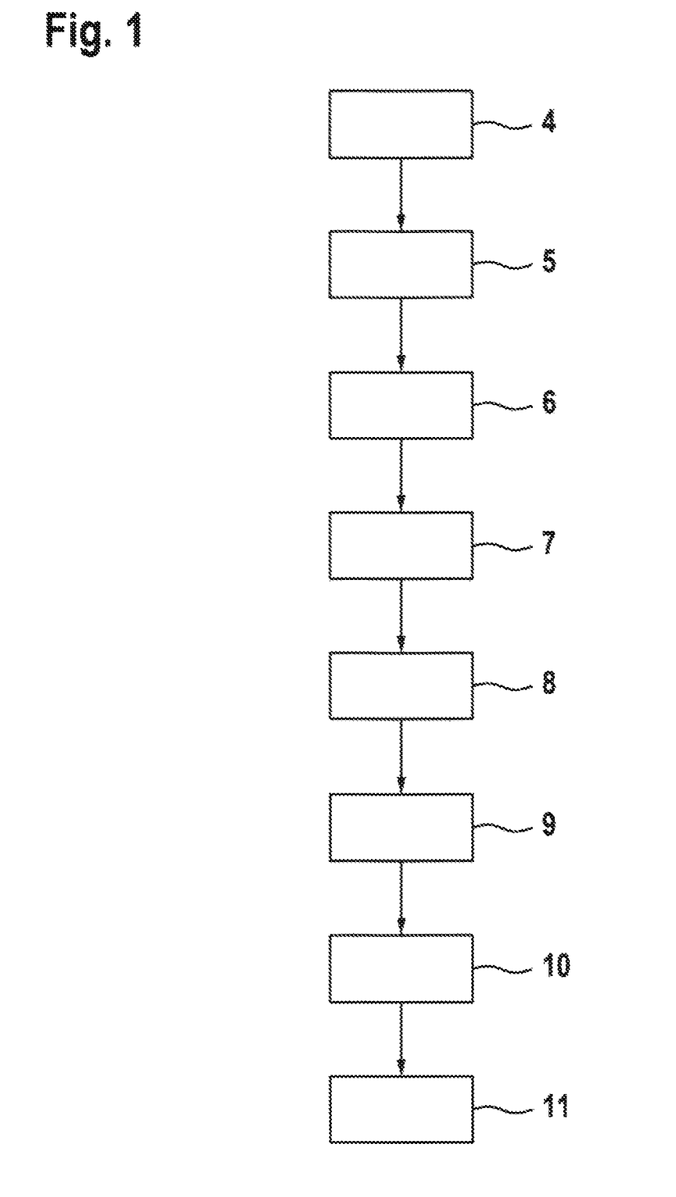
FIG. 1 a flow chart of a method for operating a transport system.

FIG. 1 shows, in schematic form, a flow chart of a method for operating a transport system 1, which has a large number of transport means 2 assembled to a total set of transport means. These transport means 2 can move independently of one another and, more preferably, are emission-free. In this case, they are, for example, electric vehicles or the equivalent. The transport system 1 serves, in particular, for the transport of a vehicle 3.

In a first step 4 of the method, a transport means request arrives at a central control unit, for example, from an operator or a customer or, alternatively, from an assistance device. By means of the transport means request, it is possible, for example, to transmit data relating to the load to be transported, that is, the vehicle 3. In the case of the vehicle 3, the data can comprise, for example, vehicle data, in particular, the type of vehicle, the number of wheel axles, the number of wheels, or the like.

From the vehicle data and, in particular, the type of vehicle, the central control unit determines key data, such as the allowed total weight, the maximum axle load, and/or the dimensions of the vehicle 3, by use of, for example, a database. It can also be provided that the data are transmitted by an assistance device of the vehicle 3 itself. In this case, the operator merely operates the assistance device of the vehicle 3, which, in turn, transmits the transport means request to the central control unit.

In a step 5, the central control unit acquires data on available transport means 2, which are assembled in the total set of transport means. For example, specific data for the individual transport means 2 are thereby checked, such as, for example, the current location, the quantity of energy needed for reaching the transport starting location and the transport destination location, and the residual quantity of energy remaining for the transport means 2. Additionally, it can be determined whether, after transport of the vehicle 3 has been carried out, the residual quantity of energy would be sufficient for reaching a maintenance device and/or charging device for the transport means 2.

Transport means 2 that are already in use, that is, in particular, transport means 2 identified as not being available, can be employed in the case that, at a specific point in time, they are located in the vicinity of the transport starting location and meet the additional requirements. In this case, the specific point in time is, in particular, the time of arrival of the other transport means 2 at their respective transport starting locations.

In a step 6, the central control unit establishes the number of transport means sufficient for transport, depending on the vehicle 3 that is to be transported, and pools the subset of transport means that contains a number of transport means 2 corresponding to the transport means number. Subsequently, the transport means 2 assigned to the subset of transport means are autonomously conveyed to the transport location or the conveyance is at least begun.

Subsequently, in a step 7, a confirmation request is made, wherein, when the confirmation request is followed by a confirmation, the transport means 2 are actually conveyed to the transport starting location. If the confirmation is absent or if an active cancellation occurs, then the subset of transport means is once again cancelled and the transport means 2 included in it are conveyed for other uses.

The actual conveyance of the transport means included in the subset of transport means 2 to the transport starting location is carried out in a step 8. This means that, in the scope of step 8, the transport means 2 actually reach the transport starting location.

In a step 9, after the transport starting location has been reached, the vehicle 3 is picked up by the transport means 2 and a static assembly is formed from the individual transport means 2. This assembly and the distances existing between the transport means 2 of the assembly are adjusted, for example, by a direct communication of the transport means 2 with one another and, in particular, controlled and/or regulated.

In a step 10, the transport means 2 are used for the transportation of the vehicle 2 to the transport destination location. Here, they move within the static or closed assembly, the dimensions of which are calculated individually on the basis of the separating distances of the transport means 2 within the assembly, the dimensions of the vehicle 3, and the dimensions of the transport means 2. These dimensions can be employed as input values for a navigation or route guidance of the transport means 2.

More preferably, the transport means 2 are equipped with a communication device for communication with the vehicle 3 that is to be transported. For example, in this case, the transport means 2 actuate a signal system of the vehicle 2, such as, for example, a system indicating the direction of travel and/or a braking indicator system. For this purpose, a communication connection, such as, for example, a wired or wireless communication connection, can be established.

In a step 11, the transport means 2 arrive together with the vehicle 3 at the transport destination location. Subsequently, the vehicle 3 is unloaded and the subset of transport means is cancelled. The unloading occurs preferably only once a transport confirmation is received by a central control unit, which, for example, is triggered or is to be triggered by the operator.

Obviously, it can also be provided that the step 11 is already triggered prematurely, that is, before the transport destination location has been reached, in particular since the operator and/or the assistance device terminate/terminates the transport prematurely. In this case, the transport is already terminated before the transport destination location has been reached, and the vehicle 3 unloaded from the transport means 3.

The described method for operating the transport system 1 can be utilized in an extremely flexible manner. In addition, the transport system 1 can be put together in a very modular manner and can be composed of identical or different transport means 2.

Figure 2:
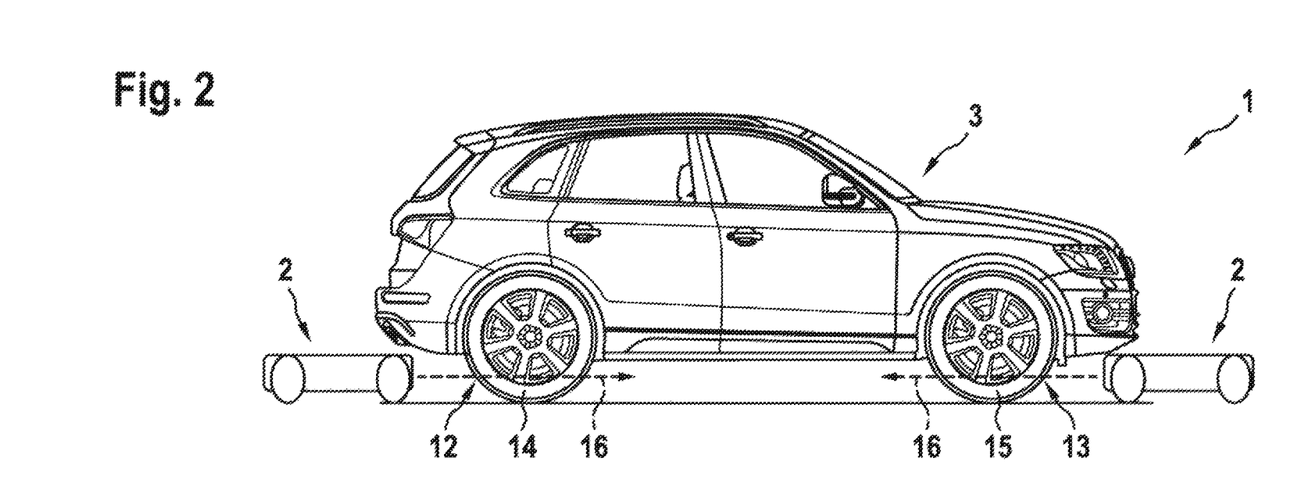
FIG. 2 transport means of the transport system prior to raising of a vehicle, and FIG. 3 the transport means of the transport system after the vehicle has been raised.

FIG. 2 shows a part of the transport system 1, namely, the transport means 2 that are assembled in the subset of transport means and are present at the transport starting location for picking up the vehicle 3. The vehicle 3 has a plurality of wheel axles 12 and 13, which are each equipped with a plurality of wheels 14 or 15. The picking up of the vehicle 3 by the transport means 2 then takes place in such a way that the transport means 2 are arranged on sides of the wheel axles 12 and 13 that face away from each other, namely, adjacent to the at least one wheel 14 or 15 of the respective wheel axle 12 or 13.

In other words, in the exemplary embodiment, one of the transport means 2 illustrated here is arranged in front and another of the transport means 2 is arranged in back of vehicle 3 (in relation to the forward direction of travel thereof). Subsequently, the transport means 2 are moved toward one another autonomously for raising the vehicle 3. This is indicated by the arrow 16.

Figure 3:
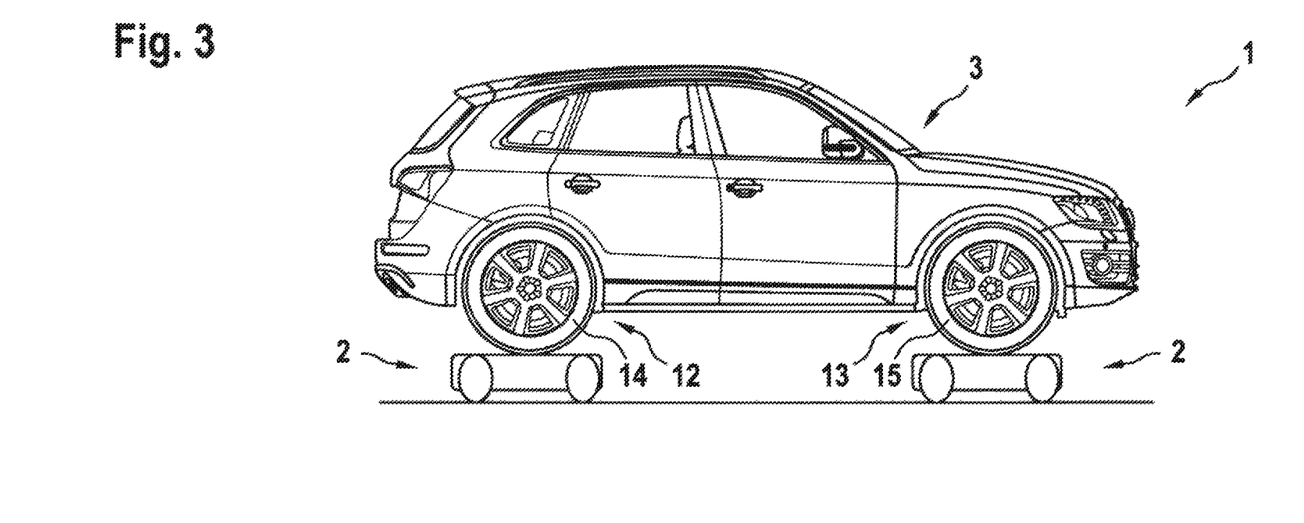

After the vehicle 3 has been raised by the transport means 2, the state shown in FIG. 3 is present. The vehicle 3 is now arranged on the transport means 2 and can be transported by said transport means to the transport destination location. Preferably, before or when the transport is carried out, the drive device of the vehicle 3 is actuated in such a way that emissions of the vehicle 3 are suppressed. In particular, therefore, a drive assembly of the drive device, which is designed, for example, as an internal combustion engine, is switched off.

In this way, it is possible or permitted by means of the transport means 2 for the vehicle 3, which is equipped with the drive assembly, also to travel into areas in which an operation of the drive assembly is not allowed, due to legal regulations, for example.

The invention claimed is:

1. A method for operating a transport system, comprising:
a plurality of independent transport means, which are assembled into a total set of transport means that includes all the transport means in the transport system, the plurality of transport means are modular and can move independently of one another, and are emission-free, the method comprising:
receiving a transport means request at a central control unit of said transport means, the transport means request containing information about and characteristic parameters of a vehicle to be transported,
selecting a subset of transport means from the total set of transport means such that the subset of transport means, based on the information and parameters in the transport means request, includes a sufficient number of transport means that are suitable for the vehicle to be transported, and
autonomously conveying the subset of transport means from respective remote locations to a transport starting location, wherein, at the transport starting location, the vehicle to be transported having a plurality of wheel axles is jointly picked up by the transport means included in the subset of transport means, wherein on sides of the wheel axles that face away from each other, at least one of the transport means is arranged adjacent to at least one wheel of a respective wheel axle, and subsequently, the transport means communicate with each other to move toward one another or away from one another autonomously for raising the vehicle.

2. The method according to claim 1, wherein the subset of transport means actuate at least one component of the vehicle by a communication connection to the vehicle.

3. The method according to claim 1, wherein, as a vehicle component, a signal system of the vehicle or a drive device of the vehicle is used to communicate with the subset of transport means.

4. The method according to claim 1, wherein the subset of transport means actuate the vehicle component in such a way that, during the loading, the wheel can rotate freely or rotates for driving onto the transport means, and/or in such a way that, after the loading, the wheel is locked during the transport.

5. The method according to claim 1, wherein, after being picked up, the vehicle is fixed in position on the subset of transport means during the transport.

6. The method according to claim 1, wherein, after it has been raised, the vehicle is transported to a transport destination location and unloaded there, and after the transport destination location has been reached by the subset of transport means, the subset of transport means is cancelled.

7. The method according to claim 1, wherein the transport means are selected for the subset of transport means on the basis of a quantity of energy needed for reaching the transport starting location and the transport destination location and/or a respectively remaining residual quantity of energy of the transport means.

8. The method according to claim 1, wherein, in the selection of the transport means for the subset of transport means, additionally, a distance of the transport destination location from a maintenance device and/or charging device for the transport means is taken into consideration.

9. The method according to claim 1, wherein, at least during the transport, the subset of transport means that jointly pick up and/or raise the vehicle autonomously keep constant a distance between them or are coupled to one another mechanically, magnetically, and/or pneumatically.

10. A transport system, comprising:
a plurality of independent transport means, which are assembled into a total set of transport means that includes all the transport means in the transport system, the plurality of transport means are modular and can move independently of one another, are emission-free, and are designed in such a way that, when a transport means request containing information about and characteristic parameters of a vehicle to be transported occurs at a central control unit of said transport means, a subset of transport means are selected from the total set of transport means such that the subset of transport means, based on the information and parameters in the transport means request, includes a sufficient number of transport means that are suitable for the vehicle to be transported, and autonomously conveyed to a transport starting location from respective remote locations, wherein, at the transport starting location, the vehicle to be transported having a plurality of wheel axles is jointly picked up by the transport means included in the subset of transport means wherein on sides of the wheel axles that face away from each other, at least one of the transport means is arranged adjacent to at least one wheel of a respective wheel axle, and subsequently, the transport means communicate with each other to move toward one another or away from one another autonomously for raising the vehicle.

* * * * *